June 2, 1925.

B. F. WILLIAMS ET AL 1,540,583

WIND MOTOR

Filed Dec. 27, 1924    2 Sheets-Sheet 1

W. S. Schlotzhauer
B. F. Williams
INVENTOR

BY Victor J. Evans
ATTORNEY

H. A. Thomas

WITNESS:

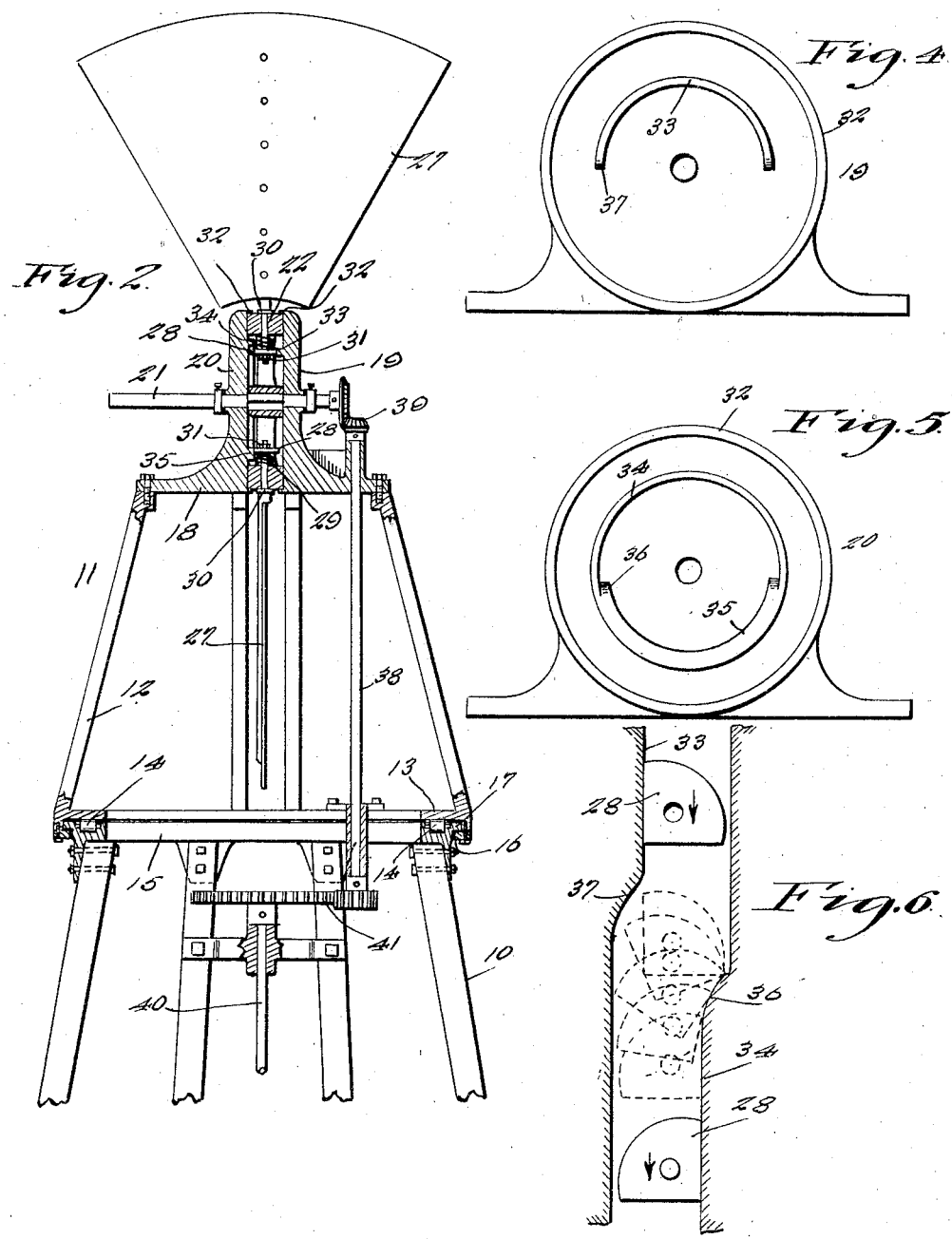

Patented June 2, 1925.

UNITED STATES PATENT OFFICE.

BENJAMIN F. WILLIAMS AND WALTER S. SCHLOTZHAUER, OF DOUGLAS, ARIZONA.

WIND MOTOR.

Application filed December 27, 1924. Serial No. 758,441.

*To all whom it may concern:*

Be it known that we, BENJAMIN F. WILLIAMS and WALTER S. SCHLOTZHAUER, citizens of the United States, residing at Douglas, in the county of Cochise and State of Arizona, have invented new and useful Improvements in Wind Motors, of which the following is a specification.

This invention relates to improvements in wind motors or what is commonly known as wind mills.

An object of the present invention is to provide a motor of this character in which the sails will be automatically turned to present their maximum surface to the action of the wind when travelling with the wind, but will present a minimum amount of resistance when travelling against the wind and thus produce a motor having a high degree of efficiency.

Another object of the invention is the provision of novel means for accomplishing the result above mentioned, and in addition to provide means for limiting the speed of operation of the motor, as well as for regulating the maximum speed.

Another object of the invention is the provision of a motor of this character which is simple in construction, reliable in operation and in which damaged or useless parts may be readily replaced.

With the above and other objects in view, the invention further includes the following novel features and details of construction, to be hereinafter more fully described, illustrated in the accompanying drawings and pointed out in the appended claims.

In the drawings:—

Figure 2 is an enlarged vertical sectional view.

Figure 4 is an inner face view of one of the combined bearing and cam plates.

Figure 5 is a similar view of the other plate.

Figure 6 is a diagrammatic view illustrating the connection of the cams.

Figure 1:
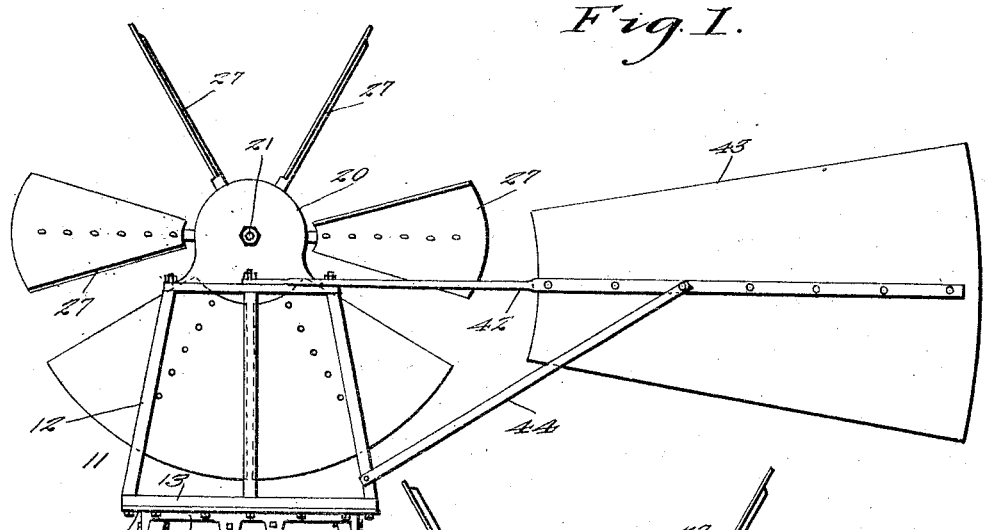
Figure 1 is an elevation showing a portion of the tower or support of the motor with the latter mounted thereon.
Figure 3:
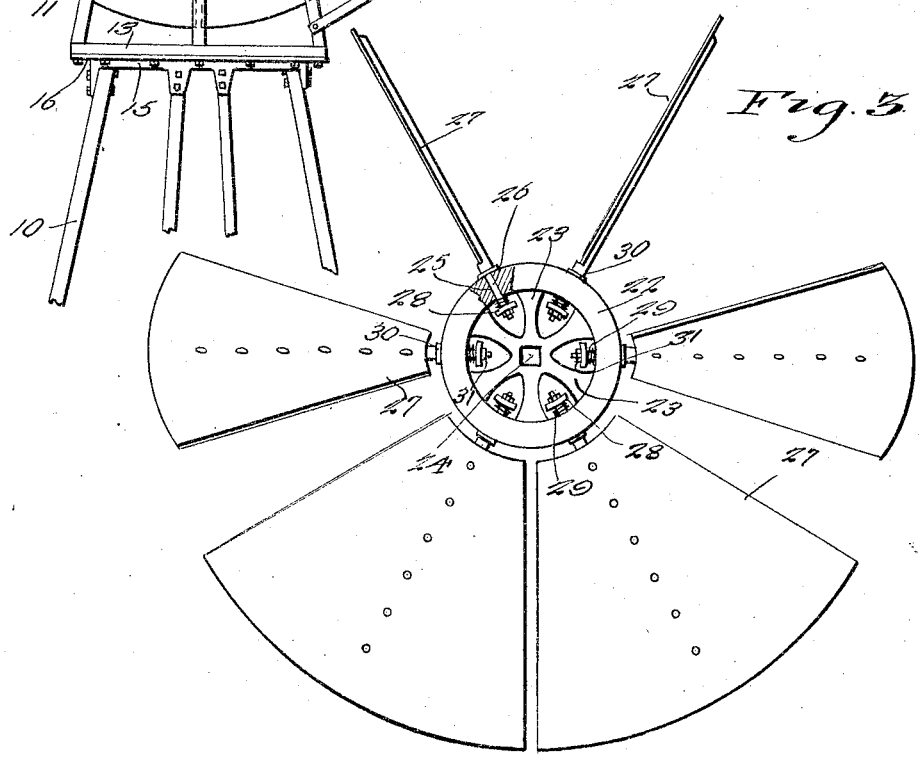
Figure 3 is an enlarged elevation partly broken away showing the rotating member or wheel.

Referring to the drawings in detail wherein like characters of reference denote corresponding parts, the reference character 10 indicates a portion of a tower or support for the motor, the head of which is rotatably mounted thereon and is indicated generally at 11. This head comprises a frame 12 which includes a bearing ring or annulus 13, the latter resting upon a plurality of anti-friction devices or rollers 14 which are mounted within a raceway provided in a ring or annulus 15 which is carried by and forms the upper part of the tower 10. A retaining ring or annulus 16 is carried by the frame 12 and is located beneath an annular flange 17 which extends from the ring or annulus 15, so that the frame will be held upon the tower in a manner to permit of free rotation.

The upper end of the frame 12 is formed by the bases 18 of spaced plates 19 and 20. These plates provide combined bearing and cam plates, a shaft 21 extending through the plates.

Secured upon the shaft 21 is a circular member or wheel whose rim 22 has connected thereto spokes 23, the shaft 21 passing through a squared opening 24 so as to rotate with the wheel. The rim 22 of the wheel is provided with radially extending spaced openings 25 through which pass the inner ends of arms 26, the latter having secured thereto sails 27. The arms 26 are slidable radially through the openings 25 and have mounted upon their inner ends cams 28 which are substantially triangular in shape as illustrated in Figure 6 of the drawings. Positioned upon the arms 26 between the cams 28 and the adjacent edge of the rim 22 are coiled springs 29 which act to yieldingly draw the arms 26 inward, movement in this direction being limited by collars or flanges 30 which are fast upon the arms 26. The cams are slidable longitudinally of the arms 26 but rotate with said arms and by adjusting the nuts 31 which are mounted upon the inner ends of the arms 26 the tension of the springs 29 may be regulated.

The plates 19 and 20 are provided with annular peripheral flanges 32 which extend over the edge of the rim 22 and thus provide a substantially leak-proof compartment which may contain grease or other lubricant to insure proper operation of the motor.

In addition, the inner face of the plate 19 is provided with a substantially semi-circular rib or cam 33, while the inner face of the plate 20 is provided with an annular rib or cam 34, the latter being thickened for a portion of its length as indicated at 35. The extremities of the portion 35 of the cam 34 are beveled or inclined as indicated at 36, while the extremities of the cam 33 are likewise beveled or inclined as indicated at 37. The plates 19 and 20 are spaced apart as shown in Figure 2 of the drawings and the ribs or cams 33 and 34 extend within this spaced portion so that the latter provides a cam race around which the cams 28 travel. The rib or cam 34 is of greater diameter than the rib or cam 33, but is arranged concentrically therewith and when the sails rotate under a normal wind velocity, one flat face of the cams will engage and travel along the portion 35 of the cam 34 so that its sail will be presented edgewise to the action of the wind. When the cam reaches the beveled or inclined end 36 of the portion 35, it will ride off of this portion which is located upon one side of the cam race and will then ride upon the inclined or beveled extremity of the cam or rib 33 and will ride over the face of this cam or rib. As the cam 28 engages the beveled or inclined extremity of the cam or rib 33 it will be rotated ninety degrees and will therefore rotate the sail so as to position the flat face of the latter in the path of the wind.

As the arms 26 are capable of radial movement, as the wind increases in velocity, the arms will travel outward against the action of the springs 29 until the cams engage the rib or cam 34 instead of the rib or cam 33, so that there will be no rotation of the cams 38 and as the sail will not present enough resistance to the wind, the speed of the motor will decrease. As soon as the speed has been sufficiently reduced, the springs 29 will draw the arms inward so that the cams 28 will again engage the rib or cam 33 during part of their rotation, whereupon the motor will again provide power for the operation of the shaft 21.

Power may be taken from the shaft 21 by any suitable means, the means shown consisting of a vertically disposed shaft 38 which is geared to the shaft 21 as shown at 39 and is also geared to a vertically disposed shaft 40 as indicated at 41.

Extending outwardly from the rotatable frame is an arm 42 which carries a vane 43, while a brace 44 serves to maintain the vane rigid with respect to the frame.

The invention is susceptible of various changes in its form, proportions and minor details of construction and the right is herein reserved to make such changes as properly fall within the scope of the appended claims.

Having described the invention what is claimed is:—

1. A wind motor comprising a horizontally rotatable frame, a vane disposed outwardly therefrom to control the position of the frame, a wind wheel mounted for rotation in the frame, a plurality of radially disposed longitudinally movable axially rotatable arms included in the wheel, sails carried by the arms, means operatively associated with the arms whereby the latter will be axially rotated during rotation of the wheel and means controlled by the speed of rotation of the wheel whereby longitudinal movement of the arms will render the arm rotating means inactive.

2. A wind motor comprising a horizontally rotatable frame, a vane disposed outwardly therefrom to control the position of the frame, a wind wheel mounted for rotation in the frame, a plurality of radially disposed longitudinally movable axially rotatable arms included in the wheel, sails carried by the arms, means operatively associated with the arms whereby the latter will be axially rotated during rotation of the wheel and means controlled by the speed of rotation of the wheel whereby the arms and their rotating means will be separated when said arms are moved longitudinally.

3. A wind motor comprising a horizontally rotatable frame, a vane disposed outwardly therefrom to control the position of the frame, a wind wheel mounted for rotation in the frame, a plurality of radially disposed longitudinally movable axially rotatable arms included in the wheel, sails carried by the arms, cams secured to the inner ends of the arms, a cam race for the cams, means located within the race in the path of and engaged by the cams whereby the latter will be axially rotated during rotation of the wheel and means controlled by the speed of rotation of the wheel to prevent engagement of the cams with the cam rotating means.

4. A wind motor comprising a horizontally rotatable frame, a vane disposed outwardly therefrom to control the position of the frame, a wind wheel mounted for rotation in the frame, a plurality of radially disposed longitudinally movable axially rotatable arms included in the wheel, sails carried by the arms, cams secured to the inner ends of the arms, a cam race for the cams, arcuate ribs located within the race in the path of and engaged by the cams, whereby the latter will be axially rotated during rotation of the wheel and means controlled by the speed of rotation of the wheel to prevent engagement of the cams and ribs when the wheel attains a predetermined speed.

In testimony whereof we affix our signatures.

BENJAMIN F. WILLIAMS.
WALTER S. SCHLOTZHAUER.